June 2, 1959     F. E. HAUSER     2,889,049
COFFEE FILTER
Filed Jan. 13, 1958

INVENTOR,
FLORENCE E. HAUSER,
BY *Frank Groom Wirtz*
ATTORNEY 2,889,049

COFFEE FILTER

Florence E. Hauser, St. Louis, Mo.

Application January 13, 1958, Serial No. 708,549

2 Claims. (Cl. 210—476)

My invention pertains to an improved filtering arrangement for coffee percolators and in particular to an accessory filter which may be used in connection with standard conventional coffee percolators already in use.

The principal object of my invention is to provide a coffee filter which has been pre-folded and pre-shaped to be inserted into the conventional coffee-holding receptacle which forms a part of the percolator, which cannot be prevented from filtering coffee by becoming clogged with the customary coffee grounds.

A further object of my invention is to form the coffee filter of a strong paper, pierced with filter holes and folded so that it will snugly engage the outer wall of the coffee-holder and also the vertical percolator tube through the center of the coffee-holder, so that coffee grounds will not be able to pass the contact boundaries at either points.

Another object of my invention is to provide the bottom or pierced lower surface of the filter with a series of concentric annular raised surfaces or corrugations which prevent clogging of the filter holes during use.

A final object of my invention is to construct the filter so that its bottom or pierced lower surface is provided with a percolator tube-receiving pressure-sealed opening, ordinarily of a diameter smaller than that of the percolator tube, and provided with radially extending slits.

Certain advantages of my invention are that the filter is automatically sealed tight against the passage of coffee grounds or sludge during the percolating cycle, and that the used coffee grounds may be handled during subsequent disposal without any difficulty or soiling of the hands.

In addition my filter will expand normally under the action of the absorption of water to unfold against the walls of the coffee-holding receptacle of the conventional percolators.

Other objects and advantages inherent in my filter construction will appear to those skilled in this art, as will be seen from the disclosures hereinafter made.

My invention consists in the novel combination, arrangement and construction of elements shown in the accompanying drawings, described in the specification, and more succinctly pointed out in the claims hereunto appended.

Figure 1:
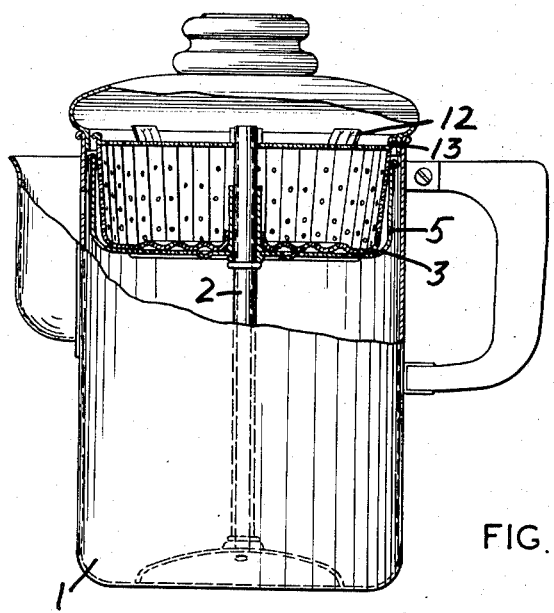
Figure 2:
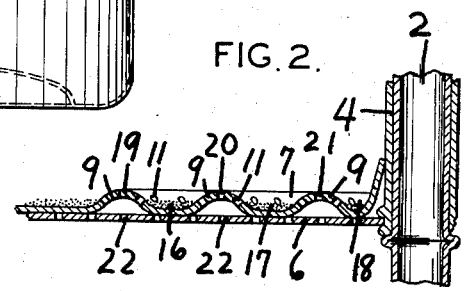
Figure 3:
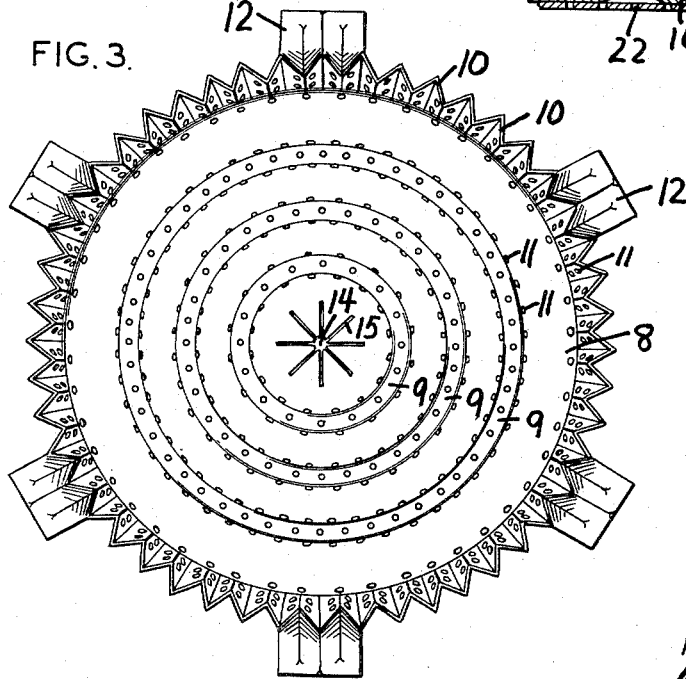

In the drawings, wherein like reference numerals represent like or corresponding parts in the various views, Figure 1 is an elevation, partially cutaway and in section, of the percolator with the filter paper shown in position, Figure 2 is an enlarged fragmentary detail view showing in cross-section, the upright or vertical percolator tube, together with the coffee-holding receptacle and the filter paper, Figure 3 is a plan view of the filter paper after forming and folding but before inserted in the percolator.

Numeral 1 denotes the outer pot of the coffee percolator, provided with a centrally located percolator tube 2 having an enlarged standard or base resting on the inside bottom of the percolator pot 1. The percolator tube 2 supports the coffee-holding receptacle 3, having an inner or centrally-located tube 4 and an outer wall 5, together with a bottom pierced plate 6.

Resting on and supported by the bottom plate 6 is my improved filter 7. As shown best in Figure 3, the filter 7 consists of a bottom 8 provided with concentric annular rings raised in the bottom surface and denoted by the numerals 9, 9. The rings are shown in cross-section in Figure 2 to consist of sinusoidally waving impressions pressed physically into the bottom of the filter 8.

The bottom of the filter 8 and the sides which are folded into V-shapes 10, 10 are pierced with the filter holes 11, 11, whose purpose is to permit passage of the liquid coffee solution and vapor while not permitting coffee grounds to pass.

The filter 7 is also provided with six tabs 12, integral therewith whose function is to project between the coffee pot top lid and the receptacle cover lid 13, so that the filter cannot be distorted from its enlarged position against the outer wall of the receptacle 3 by any action of the heated water vapor or coffee solution.

Centrally located in the bottom of the filter is the self-sealing opening 14 from which radiate the slits 15. When mounted in position upon the inner tube 4 of the coffee receptacle 3, as shown in Figure 2, the central opening 14 and its slits 15 form a seal against the vertically disposed tube 4 so that no leakage can occur around the seal to the bottom plate 6. It will be noted that when the coffee fines or grounds or silt cannot leak around this seal they must remain in the bottoms of the depressions of the annular rings as depicted in Figure 2 at 16, 17 and 18. The action of the percolator is such that the coffee liquid formed at those points floats or rolls off through the pierced holes provided as at 19, 20 and 21. The other holes 11 which remain unclogged by coffee grounds or sludge will continue to pass coffee. During careful testing I have discovered that the accumulation of sludges and grounds destroy the effectiveness of the coffee filter. I have therefore provided holes upon the waviformed sides of the annular rings which remain out of reach of the grounds during percolating and continue to pass coffee liquid. The latter then drains through the holes 22 in the bottom plate 6 into the percolator pot 1.

After brewing the coffee, it is a simple matter to clean the coffee pot. The filter is lifted out of position in the coffee-holding receptacle and all the grounds will come out in the filter. The seal of the central opening 14 against the inner tube 4 of the receptacle will be found to have wiped clean the coffee sludge which in other filters is allowed to remain at the center of the coffee receptacle. The action of brewing of the coffee will be found to have deposited the coffee only in the depressions of the annular rings. Examination will show that many of the holes 11 in the filter are clogged with coffee grounds. However these will prove to be only those which lie under little deposits of coffee grounds. The other holes will be found to have remained free of grounds and able to give passage to the coffee liquid.

Because of the increased efficiency of the filter due to the uncloggable character of the majority of the holes in this filter, it is possible to shorten the brewing time for the coffee without unduly increasing the number of holes.

Having thus described my invention, it will be apparent to those skilled in the art that many variations may be made in the same without departing from the spirit of the invention, hence I do not wish to be understood as limiting myself to the exact form, arrangement, construction and combination described, except as limited by the state of the art, and by the claims hereunto appended.

What I claim as new and desire to secure by Letters Patent is:

1. For use with a coffee percolator having a coffee pot top lid provided with a handle, a ground coffee-holding receptacle and a receptacle cover lid consisting of a disk provided with a central opening, a tubular portion on said receptacle extending vertically and passing through said cover lid central opening, a paper filter having perforations throughout adapted to be received in said receptacle, a centrally disposed opening on said filter normally smaller than the diameter of said tubular portion, slits through said filter radiating outwardly from said opening to form a seal against said tubular portion about said opening when said tubular portion is inserted through said opening, and concentric annular rings impressed in the bottom of said filter to form depressions in which coffee grounds lie, the upper surfaces of said concentric annular rings which lie between said depressions having perforations therethrough which are disposed above the level of said coffee grounds, and an outer pot.

2. The combination described in claim 1, but further characterized by tabs integral with said filter adapted to project between the coffee pot top lid and the receptacle cover lid.

References Cited in the file of this patent
UNITED STATES PATENTS

| | | |
|---|---|---|
| 1,015,407 | Selg | Jan. 23, 1912 |
| 1,306,415 | Dunlap | June 10, 1919 |
| 2,109,624 | Ramstedt | Mar. 1, 1938 |
| 2,660,313 | James | Nov. 24, 1953 |